(12) United States Patent
Bond et al.

(10) Patent No.: US 10,634,275 B1
(45) Date of Patent: Apr. 28, 2020

(54) REMOVABLE PIPE INSULATION SYSTEM

(71) Applicants: Brett Bond, Tulsa, OK (US); Alan Milligan, Tulsa, OK (US)

(72) Inventors: Brett Bond, Tulsa, OK (US); Alan Milligan, Tulsa, OK (US)

( * ) Notice: Subject to any disclaimer, the term of this patent is extended or adjusted under 35 U.S.C. 154(b) by 131 days.

(21) Appl. No.: 15/818,236

(22) Filed: Nov. 20, 2017

Related U.S. Application Data

(60) Provisional application No. 62/423,969, filed on Nov. 18, 2016.

(51) Int. Cl.
 *F16L 59/00*  (2006.01)
 *F16L 58/16*  (2006.01)
 *F16L 59/02*  (2006.01)
 *F16L 59/07*  (2006.01)

(52) U.S. Cl.
 CPC ............. *F16L 58/16* (2013.01); *F16L 59/022* (2013.01); *F16L 59/029* (2013.01); *F16L 59/07* (2013.01)

(58) Field of Classification Search
 CPC ......... F16L 55/00; F16L 55/02; F16L 55/022; F16L 55/023; F16L 55/024; F16L 55/026; F16L 55/029
 USPC .......... 138/149, 156, 128, 151, 110; 428/100
 See application file for complete search history.

(56) References Cited

U.S. PATENT DOCUMENTS

| | | | | |
|---|---|---|---|---|
| 5,934,337 A | * | 8/1999 | Fiala | F16L 59/023 138/149 |
| 7,624,762 B2 | * | 12/2009 | Cohen | B32B 15/08 138/149 |
| 8,176,943 B2 | * | 5/2012 | Stroempl | F16L 11/125 138/133 |
| 2004/0079431 A1 | * | 4/2004 | Kissell | F16L 59/021 138/149 |
| 2009/0223585 A1 | * | 9/2009 | Buller | E03B 7/10 138/110 |
| 2015/0260329 A1 | * | 9/2015 | Bond | F16L 59/029 428/35.2 |

* cited by examiner

*Primary Examiner* — Patrick F Brinson
(74) *Attorney, Agent, or Firm* — Head, Johnson, Kachigian & Wilkinson, PC

(57) ABSTRACT

A removable pipe insulation system comprising one or more components, each component comprising insulation in a waterproof covering with at least one opening for air to exit the covering during use. The insulation in the covering may be surrounded by an inside skin with a plurality of holes formed through hot micro perforation. The inside skin may be surrounded by an outside cover, which may be edged in elastic binding and which may attach to itself by hook and loop fastener. The component may be wrapped around a pipe element and secured to provide insulation to the pipe element while protecting the insulation from moisture and protecting the pipe element from corrosion under insulation.

33 Claims, 10 Drawing Sheets

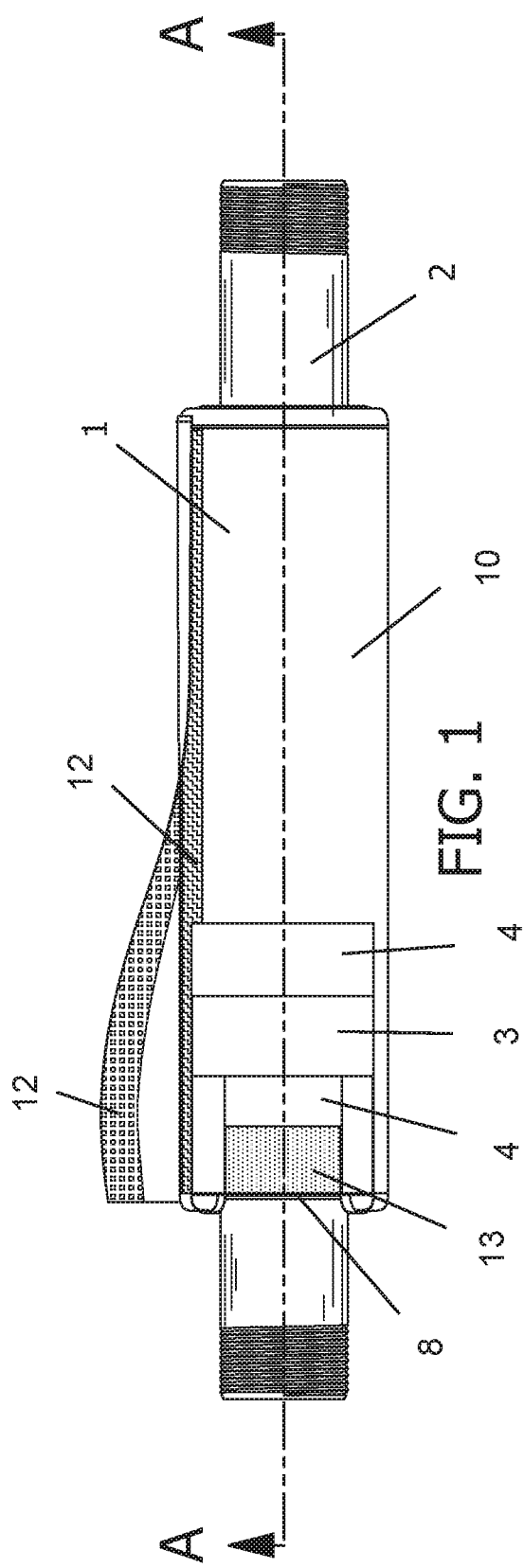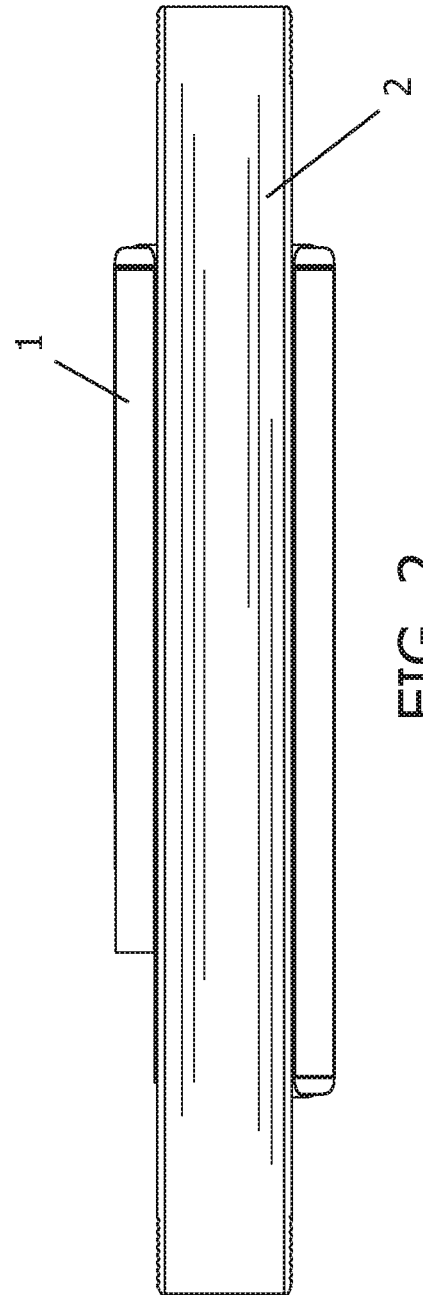

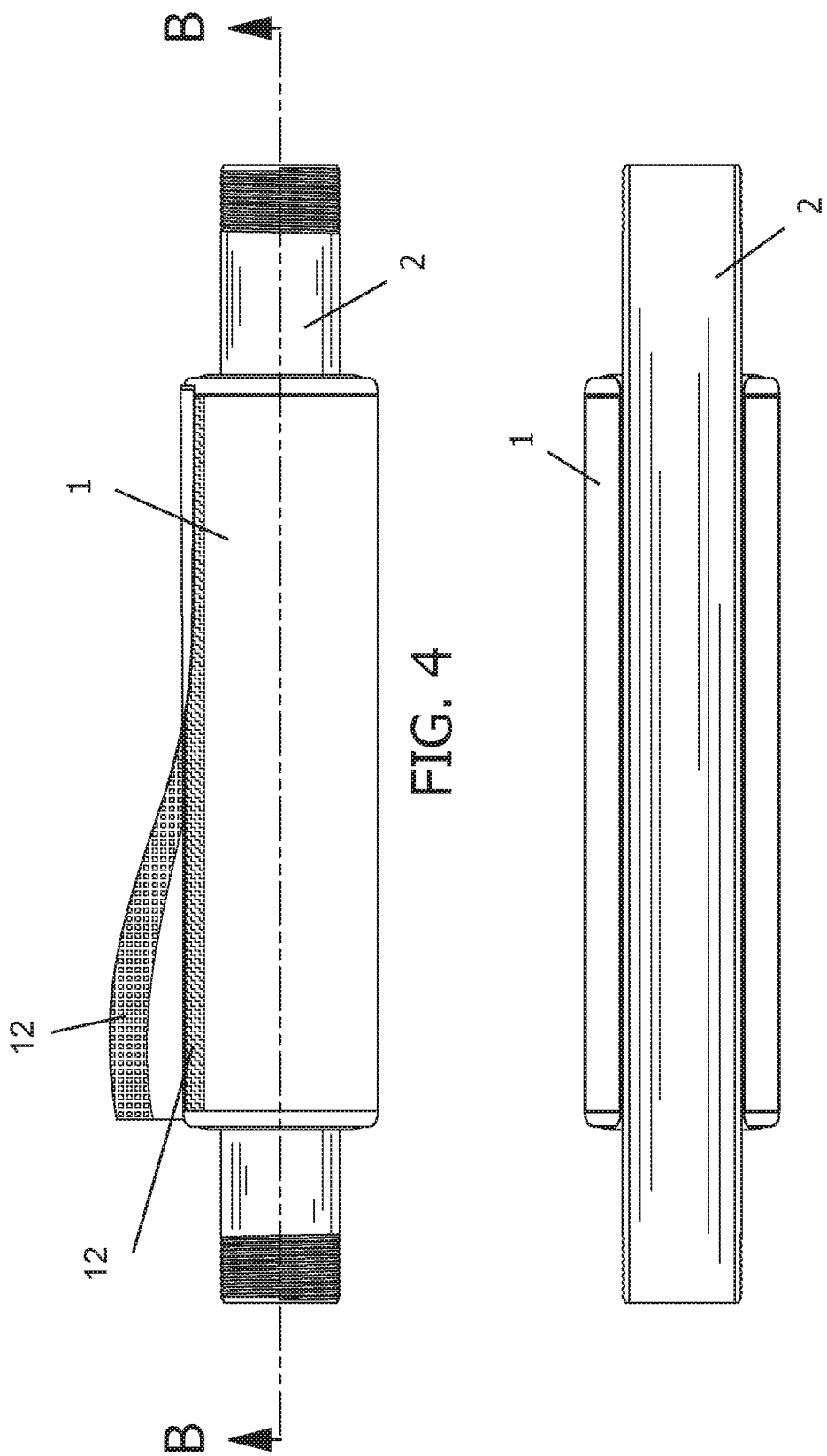

REMOVABLE PIPE INSULATION SYSTEM

CROSS REFERENCE

This application is based on and claims priority to U.S. Application No. 62/423,969 filed Nov. 18, 2016.

BACKGROUND OF THE INVENTION

Field of the Invention

This invention relates generally to pipe insulation and more particularly, but not by way of limitation, to a system of removable waterproof insulation for pipes.

Description of the Related Art

Insulation, particularly outdoor insulation, is vulnerable to moisture, which may result in a deterioration of insulative value. Traditional insulation wicks moisture, exacerbating any moisture exposure. When the insulation is placed on pipes, moisture in the insulation may also lead to corrosion of the pipes. When wet, chemicals in the insulation react with virtually all metal pipes, causing corrosion under insulation (CUI). Furthermore, traditional insulation is not easily reused. Inspection and service typically renders the existing insulation useless, requiring expensive replacement.

Typically, insulation is placed around a pipe with a heat trace in raw form and is then clad in tin and secured with sheet metal screws. The seams are caulked in an attempt to prevent moisture from reaching the insulation, but this attempt is typically unsuccessful. Any hole in the caulking or the tin, such as along seams and around the screw holes, allows moisture to reach the insulation. The insulation wicks water in, where it reacts with chemicals in the fiberglass, allowing the chemicals to leach out and corrode the underlying pipe. Inspections and repairs require holes to be bored through the tin and into the insulation, providing further points of ingress for moisture.

Modular insulation is known in the art, where insulation is wrapped around pipes and held in place by any of a variety of fasteners. This allows the insulation to be easily removed for inspection and repair, and allows the insulation to be reused if it is still in good condition. These modular systems do not, however, address the moisture problem. The insulation in such modular systems is still vulnerable to moisture, and the non-insulative elements of such systems inadequately protect the insulation from moisture or the underlying pipes from corrosion.

Attempts have been made to seal insulation inside a waterproof casing, but such attempts have produced new challenges. Specifically, given the compressible nature of traditional insulation, air is typically trapped within the waterproof casing along with the insulation. As the insulation is wrapped around a pipe, the air forms a bubble that often makes proper wrapping difficult if not impossible and increases the possibility of rupture of the waterproof casing, allowing moisture to reach the insulation and defeating the purpose of the casing.

Based on the foregoing, it is desirable to provide durable, removable insulation that would stay dry in the worst of outdoor conditions, while still providing easy access to pipes and fittings for inspection, service, and repair, without damaging the insulation so that it can be reused over and over, thus bringing a long term value to the insulation.

SUMMARY OF THE INVENTION

In general, in a first aspect, the invention relates to a pipe insulation system comprising one or more components, each component comprising: insulation; two layers of waterproof material, where the insulation is intermediate of the two layers; at least one opening between the two layers such that air may travel from between the two layers to outside the two layers; and a cover surrounding the two layers. The cover may comprise an inside skin adjacent the first layer of waterproof material and an outside skin adjacent the second layer of waterproof material. Alternately, the pipe insulation system may comprise the insulation surrounded by the cover, and may further comprise the two layers of waterproof material with the insulation intermediate of the two layers.

The pipe insulation system may further comprise a layer of adhesive between the inside skin and first layer of waterproof material. The inside skin may be heat resistant to 500° F. The inside skin may have a plurality of holes, which may each have a diameter of 0.025 mm to 1 mm. The plurality of holes may be formed through hot micro perforation. The inside skin may be fiberglass coated on one or both sides with silicone.

The two layers of waterproof material may be heat resistant to 400° F. Specifically, the two layers of waterproof material may be nylon. The two layers of waterproof material may form a sleeve with one or two open ends. Each of the ends may be folded over and secured with at least one fastener, such as tape.

The outside cover may be air permeable. The cover may be edged in binding and the binding may be elastic. The pipe insulation system may further comprise one or more attachment devices such that the component may be secured to a pipe element via the attachment devices. The attachment devices may be areas of hook material and loop material on the cover, such that the component may be secured against itself after being wrapped around the pipe element. Each of the one or more components may be sized and shaped to fit around a particular pipe element.

In a second aspect, the invention relates to a method of manufacturing pipe insulation comprising: placing insulation between two layers of waterproof material; partially sealing the two layers of waterproof material against each other, leaving at least one opening through which air may travel from between the two layers to outside the two layers; and surrounding the insulation between the layers with a cover. The cover may comprise an inside skin adjacent the first layer and an outside skin adjacent the second layer. The method may further comprise spraying the first layer with adhesive prior to surrounding the insulation between the layers with the cover. The inside skin may have a plurality of holes formed through hot micro perforation. The cover may have one or more edges, and the method may further comprise sealing at least one of the edges of the cover with binding, where the binding is elastic. The two layers of waterproof material may form a sleeve with one or two open ends, and the method may further comprise folding each of the ends over and securing each of the ends with tape.

BRIEF DESCRIPTION OF THE DRAWINGS

FIG. 1 is a side partial cutaway view of a pipe insulation component of the present invention in place on a straight pipe element, with one corner raised;

FIG. 2 is a cross sectional view of FIG. 1 as indicated by line A;

FIG. 4 is a side view of the pipe insulation component in place on a straight pipe element, with one corner raised;

FIG. 5 is a cross sectional view of FIG. 4 as indicated by line B;

Figure 3:
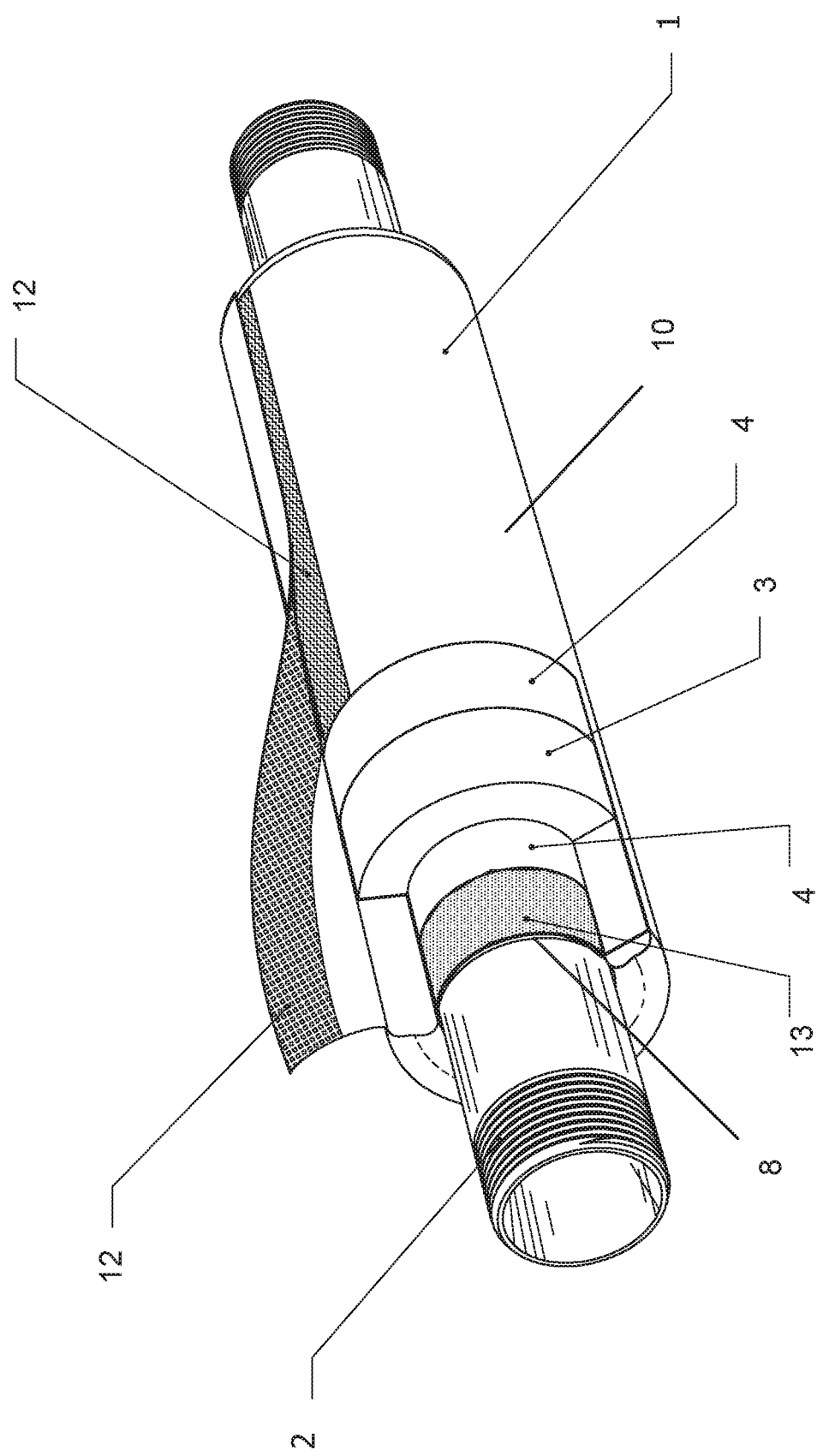
FIG. 3 is a perspective partial cutaway view of the pipe insulation component in place on a straight pipe element, with one corner raised.
Figure 6:
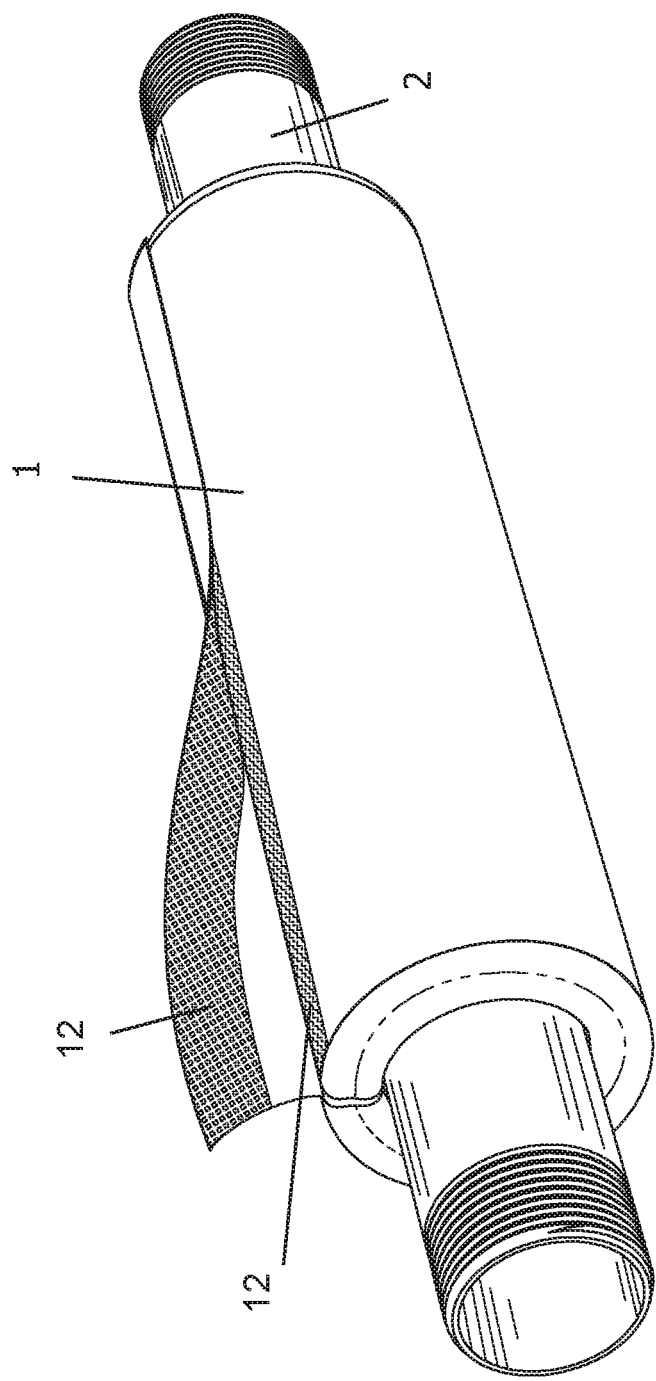
FIG. 6 is a perspective view of the pipe insulation component in place on a straight pipe element, with one corner raised.
Figure 7:
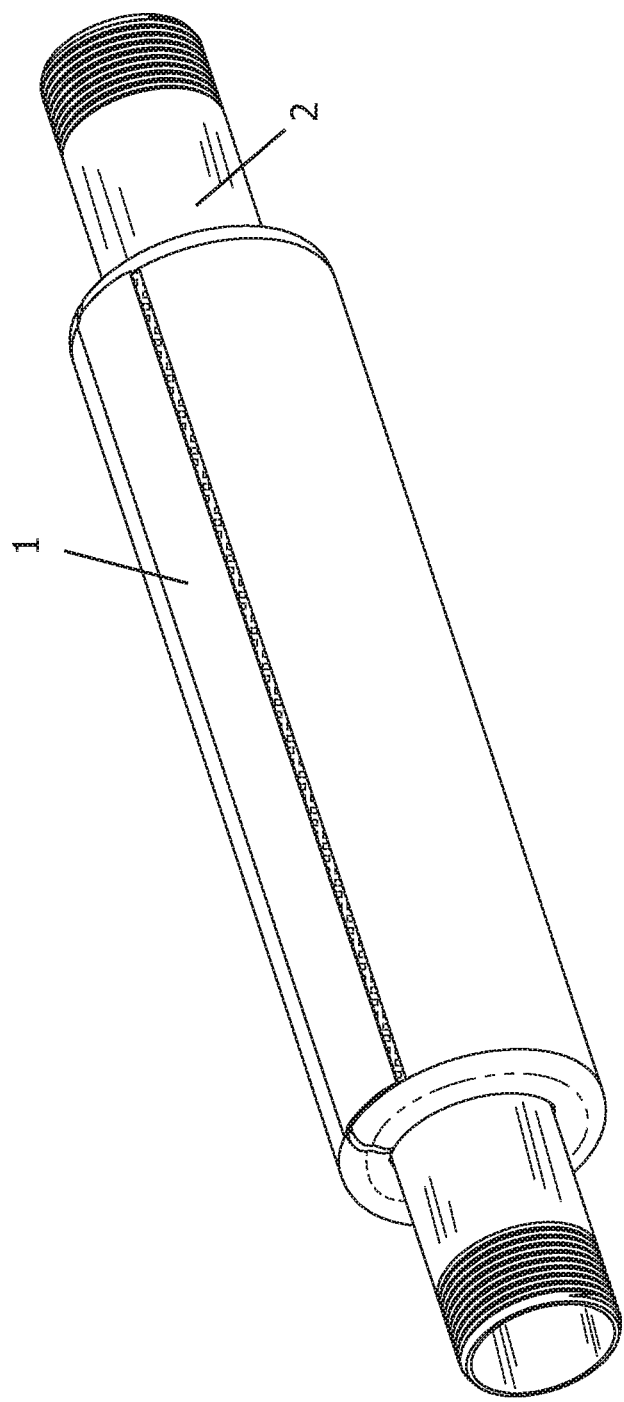
FIG. 7 is a perspective view of the pipe insulation component in place on a straight pipe element.
Figure 8:
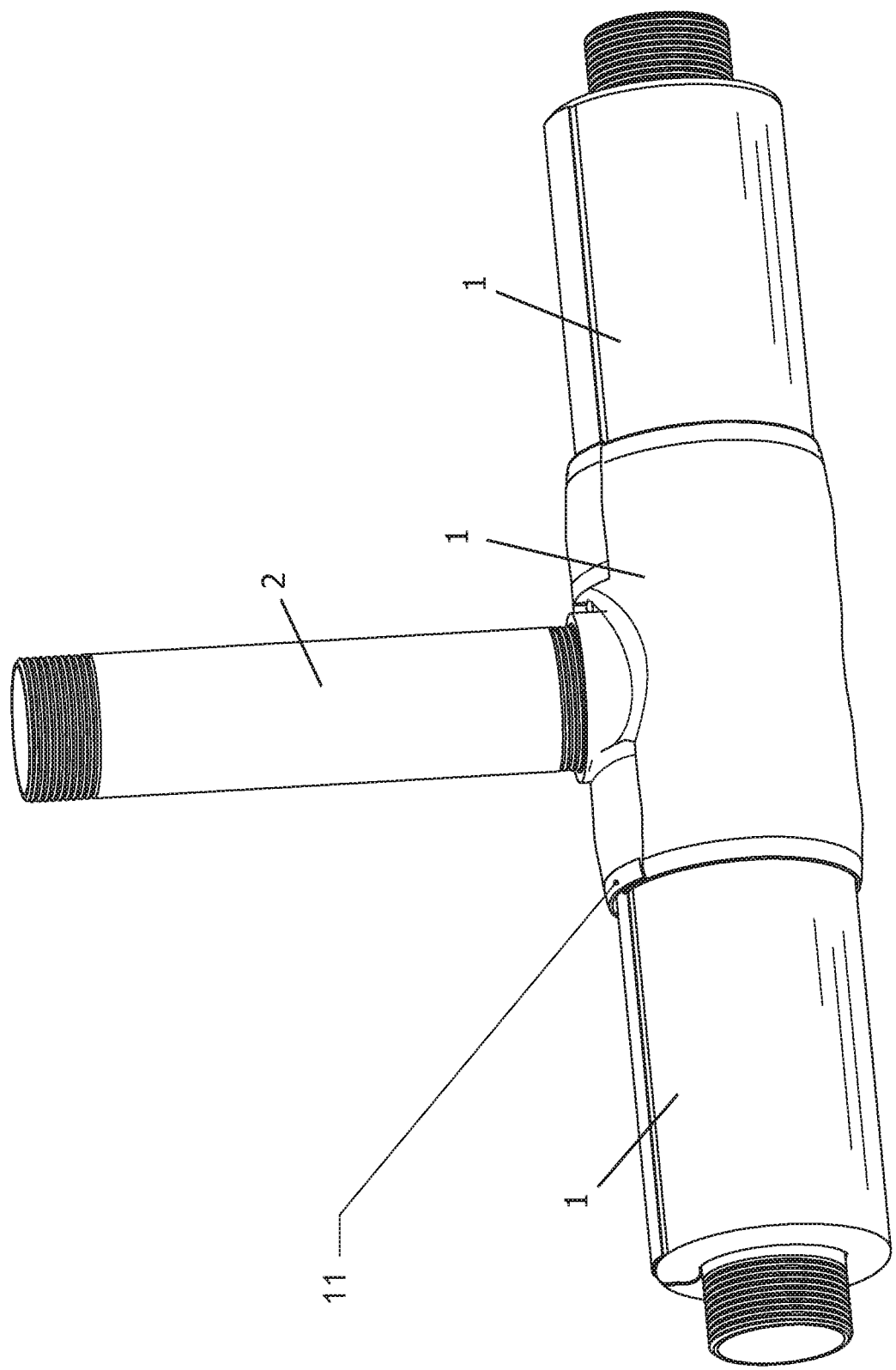
FIG. 8 is a perspective view of a set of pipe insulation components in place on a tee junction pipe element.
Figure 9:
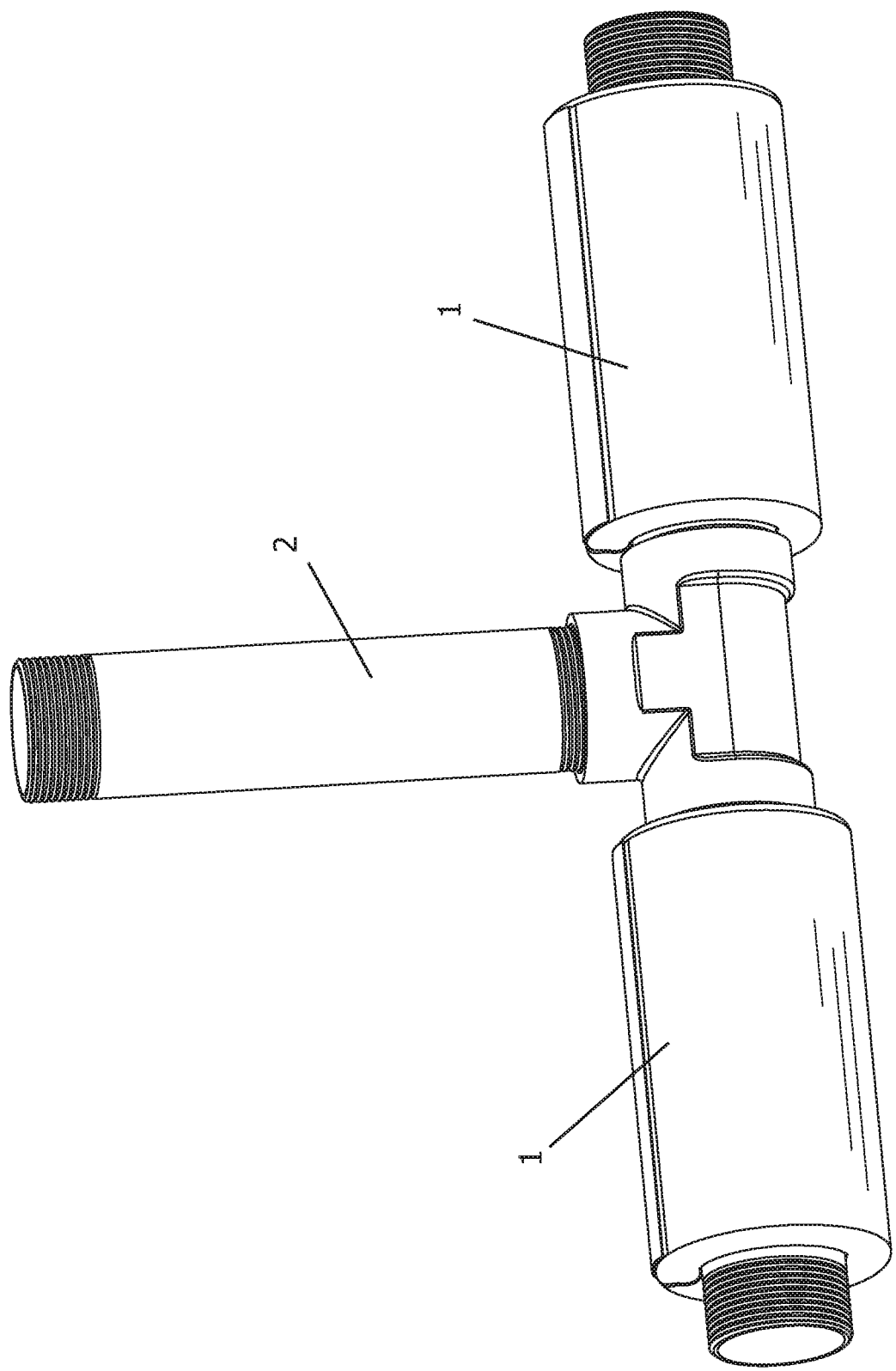
FIG. 9 is a perspective view of the set of pipe insulation components in place on a tee junction pipe element with the center component removed.
Figure 10:
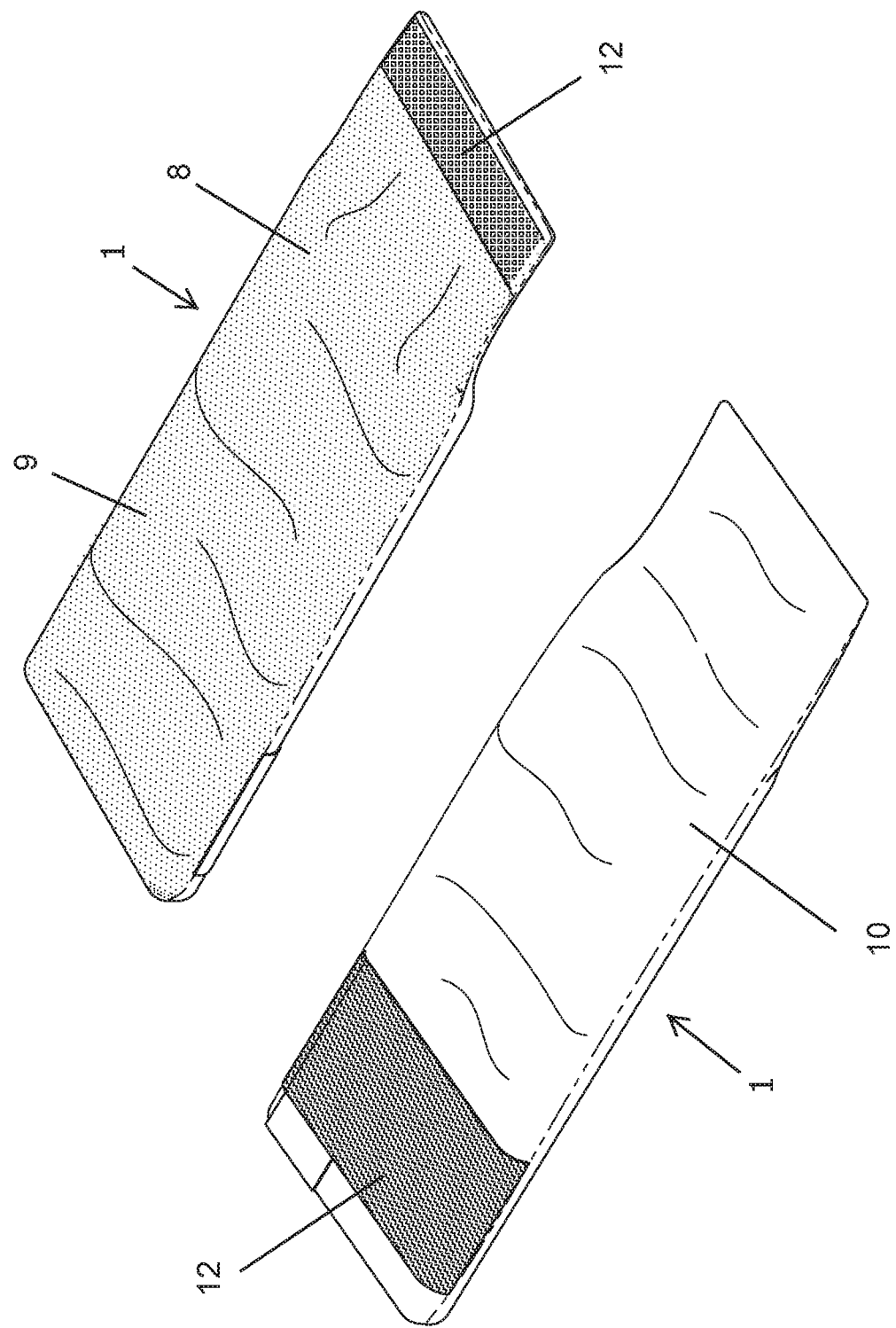
FIG. 10 is a perspective view of the front and back of a pipe insulation component shaped for use on a straight pipe element.
Figure 11:
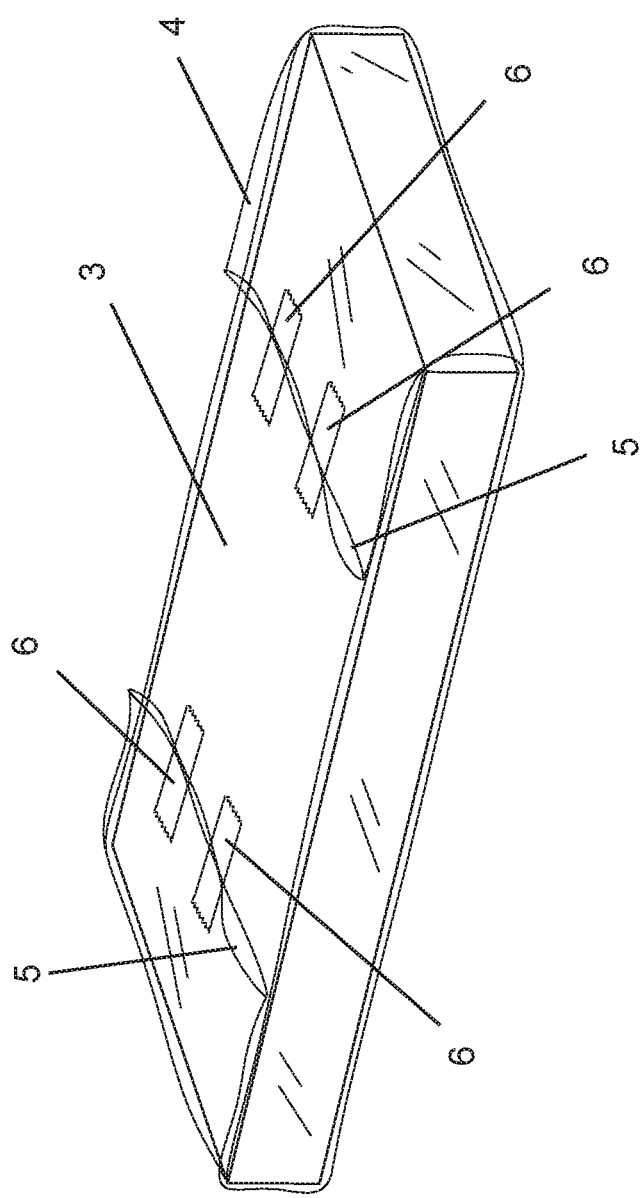
FIG. 11 is a perspective view of the insulation and covering of a pipe insulation component.
Figure 12:
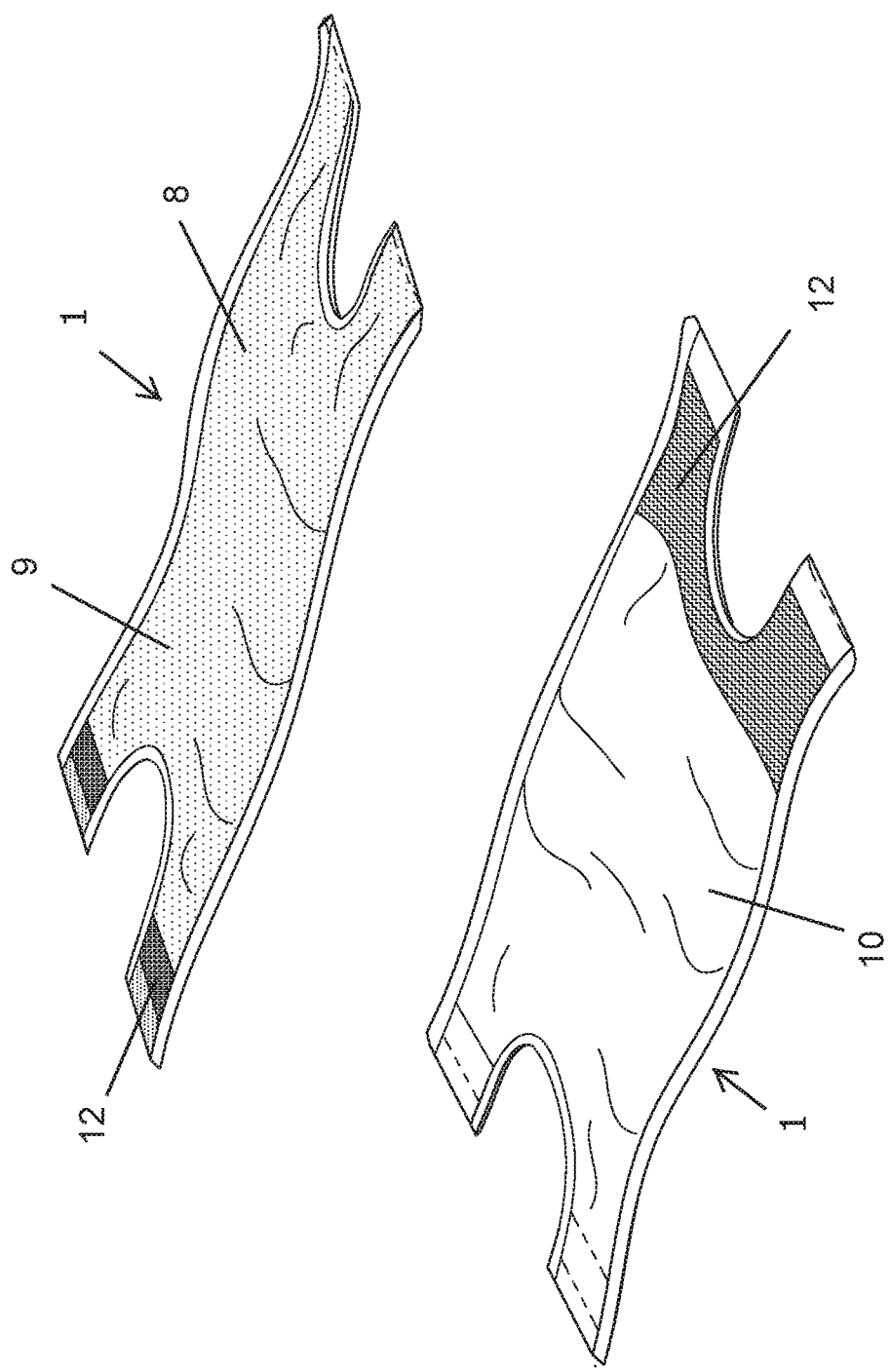
FIG. 12 is a perspective view of the front and back of a pipe insulation component shaped for use on a tee junction pipe element.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a removable pipe insulation system. The system may be modular: it may include a plurality of components 1, each tailored for a standard pipe element 2. Such elements may include straights, tees, elbows, flanges, valves, nipples, or other elements in any desired size. Each component 1 of the system may be shaped and sized appropriately to provide insulation to one such pipe element 2. While each component may have a distinct shape, for the sake of simplicity, the Figures herein all show a straight component 1 in place on a straight pipe 2. During use, a plurality of components 1 of the system may be utilized to fully insulate a section of or an entire pipeline, as desired. For example, if a pipeline had two straight sections joined by an elbow, three components 1 of the insulation system may be used: two sized and shaped to cover the straight sections and one sized and shaped to cover the elbow. Each component 1 may be placed around its designated pipe element 2 and secured such that insulates that element 2. Each component 1 may abut or overlap its neighboring component 1 to ensure maximum insulation.

Each component 1 of the insulation system may comprise insulation 3 in a waterproof covering 4 with at least one opening 5. The insulation 3 may be loose or blanket-type insulation, and may be made of fiberglass or any other desired insulation, such as sponge rubber or aerogel. The covering 4 may be waterproof and may be made of a heat resistant material, allowing the system to be used on a pipe with a heat trace. Preferably, the covering 4 may be heat resistant to 400° F. For example, the covering 4 may be made of nylon, such as nylon 6, 66, or 612, or any other desired heat resistant material. If no heat trace will be used, the covering 4 may be made of polypropylene, polyethylene, or any other desired material.

The covering 4 may be a sleeve with two open ends 5, as shown; a bag with one open side 5 and three closed sides; or any other desired shape that substantially covers the insulation 3 but provides at least one opening 5. The insulation 3 may be placed within the covering 4 via the opening 5. Once the insulation 3 is inside the covering 4, the opening 5 may be secured in a closed position to prevent the insulation 3 from escaping the covering 4, but where air may still exit the covering 4. For example, if the covering 4 is a sleeve, as shown, each of the open ends 5 may be folded over once and secured with a fastener 6. The fastener 6 may be tape, as shown, or any other desired fastener, such as adhesive, stitching, heat sealing, etc. This allows air to exit the covering 4 as the insulation is folded, curved, or rolled and prevents the formation of an air bubble within the covering 4, but minimizes the possibility of moisture entering the covering 4 and reaching the insulation 3. Even if a small amount of moisture enters the covering 4, the covering 4 prevents the now-wet insulation 3 from coming into contact with the pipe 2 upon which it is placed, thus preventing CUI. Another option for substantially closing the opening 5 is through parallel heat seals with offset openings: the opening 5 may be heat sealed from a first side almost to an opposing second side, leaving a small gap near the second side. A second parallel heat seal may be made from the second side almost to the first side, leaving a small gap near the first side. During use, air forced out of the covering 4 may travel through the first gap, along the channel created by the heat seals, and out the second gap. Moisture could enter the covering 4 by reversing the path, but this is unlikely unless the component 1 is completely submerged. Again, even if a small amount of moisture enters the covering 4, the covering 4 prevents the now-wet insulation 3 from coming into contact with the pipe 2 upon which it is placed, thus preventing CUI. Alternately, the opening 5 may be fully sealed but an alternate one-way valve 7 in the covering 4 may allow air to exit the covering 4 during use while minimizing ingress of moisture. The covering 4 may not be vacuum sealed.

The insulation 3 in the covering 4 may be covered on one side by an inside skin 8 and on the other side by an outside cover 10. The edges of the inside skin 8 may be attached to the edges of the outside cover 10, with the insulation 3 in the covering 4 lying between the inside skin 8 and the outside cover 10. The outside skin 8 may be attached to the outside cover 10 by stitching, adhesive, or any other desired attachment device or combination of attachment devices. During use, the inside skin 8 may be placed against or adjacent the pipe element 2, while the outside cover 10 covers the entire component 1 and acts as a barrier to the outside.

A layer of adhesive 13 may be located between the covering 4 and the inside skin 8 to prevent the covering 4 from moving significantly relative to the inside skin 8. For example, before being covered on one side with the inside skin 8, the outside of covering 4, the inside of the inside skin 8, or both the outside of the covering 4 and the inside of the inside skin 8 may be sprayed with adhesive spray. The inside skin 8 may be made of fiberglass and may be coated on one or both sides with silicone. The inside skin 8 may have a plurality of small holes 9 formed by hot micro perforation. Again, this allows air to travel through the inside skin 8 during use, preventing air bubble formation, while minimizing the amount of moisture that can pass through the inside skin 8. Hot micro perforation may be accomplished by rolling a heated drum covered in small needles across the inside skin 8 during manufacture to produce the plurality of tiny holes 9. The fact that the drum, and consequently each needle, is heated may cause the edges of the holes to cauterize, producing clean edges. The holes 9 may be sufficiently small that they are difficult to see with the naked eye without holding the inside skin 8 up to a light source. For example, the holes 9 may each have a diameter of 0.025 mm to 1 mm, preferably 0.05 mm. Alternately, the holes 9 in the inside skin 8 may be formed through cold perforation, laser perforation, or any other desired process. Alternately, the inside skin 8 may be made of any other desired material. The material of the inside skin 8 may be heat resistant, preferably up to 500° F.

The outside cover 10 may be air permeable or may be air impermeable. The outside cover 10 may be made of any desired material. The outside cover 10 may be made of UV resistant material or covered with a UV resistant coating, such as PTFE or silicone.

The component 1 may have one or more strips of binding 11 along one or more edges or otherwise along one or more area of the component 1. The binding 11 may be made of an elastic material, such as polyester thread covering woven neoprene elastomer bands or other desired material, to provide a snug fit of the component 1 against the pipe element 2.

The component 1 may have one or more attachment devices 12 for securing the component 1 against itself once it is in place around the pipe element 2. For example, as shown, the attachment devices 12 may include an area of hook material extending from one edge of the component 1 and a corresponding area of loop material on the outside cover 10. Other possible attachment devices 12 may include grommets for lacing, rivets, buckles, straps, cords, hooks, or any other desired attachment device. Preferably, the attachment devices 12 may be reversible, such that the component 1 may be removed from the pipe element 2 as desired, and may subsequently be reinstalled on the pipe element 2 or another pipe element 2 as desired.

During manufacture of the component 1, all elements may be cut and/or formed to a desired size and shape, depending on the pipe element 2 the component 1 is meant to insulate. The insulation 3 may be placed within the covering 4. The ends 5 of the covering 4 may be folded over and secured with the fastener 6. The outside of the covering 4 may be sprayed with adhesive 13, and the insulation 3 in the covering 4 may be covered on one side with the inside skin 8 on the other side with the outside cover 10. The inside skin 8 may be stitched or otherwise attached to the outside cover 10 along one or more edges prior to covering the insulation 3 in the covering 4 with the inside skin 8 and outside cover 10, leaving at least one opening through which the insulation 3 in covering 4 may be inserted and situated between the inside skin 8 and outside cover 10. The opening may then be closed, fully encasing the insulation 3 in cover 4 between the inside skin 8 and outside cover 10. Binding 11 may be added to one or more edges of the component 1. The insulation 3 may thus be protected by the covering 4, the inside skin 8 on one side, and the outside cover 10 on the other side.

During use, the component 1 may be wrapped around a pipe element 2 and secured to itself via the attachment devices 12. As the insulation 3 is compressed, air may escape the component 1 by exiting the covering 4 through the opening 5 or valve 7, traveling through the tiny holes 9 in the inside skin 8 or through the outside cover 10. For moisture to reach the insulation 3, it would have to travel through the outside cover 10 or through the tiny holes 9 in the inside skin 8, make its way between the outside cover 10 or the inside skin 8 and the covering 4 to the opening 5, and travel through the opening 5 to reach the insulation 3. The minimization of the opening 5, the small size of the holes 9, and the overall number of layers minimizes the likelihood that a substantial amount of moisture will reach the insulation 3. Even if some moisture does reach the insulation 3, the corrosive chemicals leached from the insulation 3 would then have to reverse the entire journey to reach the pipe 2, further reducing the likelihood of CUI. The component 1 may be easily removed for inspection and service and replaced on the same pipe element 2 or placed on a different pipe element 2, as desired.

Whereas, the devices and methods have been described in relation to the drawings and claims, it should be understood that other and further modifications, apart from those shown or suggested herein, may be made within the spirit and scope of this invention.

What is claimed is:

1. A pipe insulation system comprising one or more components, each component comprising:
   insulation;
   two layers of waterproof material, where the insulation is intermediate of the two layers and where the two layers of waterproof material form a sleeve with one or two open ends where each of the ends is folded over;
   at least one opening between the two layers such that air may travel from between the two layers to outside the two layers; and
   a cover surrounding the two layers.

2. The pipe insulation system of claim 1 where the two layers of waterproof material comprise a first layer and a second layer and where the cover comprises an inside skin adjacent the first layer and an outside skin adjacent the second layer.

3. The pipe insulation system of claim 2 further comprising a layer of adhesive between the inside skin and the first layer.

4. The pipe insulation system of claim 2 where the inside skin is heat resistant to 500° F.

5. A pipe insulation system comprising one or more components, each component comprising:
   insulation;
   two layers of waterproof material, where the insulation is intermediate of the two layers and the two layers of waterproof material comprise a first layer and a second layer;
   at least one opening between the two layers such that air may travel from between the two layers to outside the two layers; and
   a cover surrounding the two layers, where the cover comprises an inside skin adjacent the first layer and an outside skin adjacent the second layer and where the inside skin has a plurality of holes.

6. The pipe insulation system of claim 5 where the plurality of holes each have a diameter of 0.025 mm to 1 mm.

7. The pipe insulation system of claim 5 where the plurality of holes are formed through hot micro perforation.

8. The pipe insulation system of claim 5 where the inside skin is fiberglass coated on one or both sides with silicone.

9. The pipe insulation system of claim 1 where the two layers of waterproof material are heat resistant to 400° F.

10. The pipe insulation system of claim 1 where the two layers of waterproof material are nylon.

11. The pipe insulation system of claim 1 where each of the ends is secured with at least one fastener.

12. The pipe insulation system of claim 11 where the fastener is tape.

13. The pipe insulation system of claim 5 where the outside skin is air permeable.

14. A pipe insulation system comprising one or more components, each component comprising:
   insulation;
   two layers of waterproof material, where the insulation is intermediate of the two layers;
   at least one opening between the two layers such that air may travel from between the two layers to outside the two layers; and
   a cover surrounding the two layers where the cover is edged in binding and where the binding is elastic.

15. The pipe insulation system of claim 1 further comprising one or more attachment devices such that the component may be secured to a pipe element via the attachment devices.

16. The pipe insulation system of claim 15 where the attachment devices are areas of hook material and loop material on the cover, such that the component may be secured against itself after being wrapped around the pipe element.

17. The pipe insulation system of claim 1 where each of the one or more components is sized and shaped to fit around a particular pipe element.

18. A method of manufacturing pipe insulation comprising:
   placing insulation between two layers of waterproof material, where the two layers of waterproof material form a sleeve with one or two open ends;
   folding over each of the ends;
   partially sealing the two layers of waterproof material against each other, leaving at least one opening through which air may travel from between the two layers to outside the two layers; and
   surrounding the insulation between the layers with a cover.

19. The method of claim 18 where the cover has a first side comprising an inside skin and a second side comprising an outside skin.

20. The method of claim 19 where the two layers of waterproof material comprise a first layer adjacent the inside skin and a second layer adjacent the outside skin, the method further comprising spraying the first layer with adhesive prior to surrounding the insulation between the layers with a cover.

21. The method of claim 19 where the inside skin has a plurality of holes formed through hot micro perforation.

22. The method of claim 18 where the cover has one or more edges, the method further comprising sealing one or more of the edges of the outside cover with binding, where the binding is elastic.

23. The method of claim 18, the method further comprising securing each of the ends with tape.

24. A method of manufacturing pipe insulation comprising:
   placing insulation between two layers of waterproof material;
   partially sealing the two layers of waterproof material against each other, leaving at least one opening through which air may travel from between the two layers to outside the two layers; and
   surrounding the insulation between the layers with a cover, where the cover has a first side comprising an inside skin and a second side comprising an outside skin and where the inside skin has a plurality of holes.

25. The method of claim 24 where the two layers of waterproof material comprise a first layer adjacent the inside skin and a second layer adjacent the outside skin, the method further comprising spraying the first layer with adhesive prior to surrounding the insulation between the layers with a cover.

26. The method of claim 24 where the plurality of holes is formed through hot micro perforation.

27. The method of claim 24 where the cover has one or more edges, the method further comprising sealing one or more of the edges of the outside cover with binding, where the binding is elastic.

28. The method of claim 24 where the two layers of waterproof material form a sleeve with one or two open ends, the method further comprising folding each of the ends over and securing each of the ends with tape.

29. A method of manufacturing pipe insulation comprising:
   placing insulation between two layers of waterproof material;
   partially sealing the two layers of waterproof material against each other, leaving at least one opening through which air may travel from between the two layers to outside the two layers; and
   surrounding the insulation between the layers with a cover, where the cover is edged in binding and where the binding is elastic.

30. The method of claim 29 where the cover has a first side comprising an inside skin and a second side comprising an outside skin.

31. The method of claim 30 where the two layers of waterproof material comprise a first layer adjacent the inside skin and a second layer adjacent the outside skin, the method further comprising spraying the first layer with adhesive prior to surrounding the insulation between the layers with a cover.

32. The method of claim 30 where the inside skin has a plurality of holes formed through hot micro perforation.

33. The method of claim 29 where the two layers of waterproof material form a sleeve with one or two open ends, the method further comprising folding each of the ends over and securing each of the ends with tape.

* * * * *